United States Patent [19]

Bahrenburg

[11] 4,265,086
[45] May 5, 1981

[54] WIND FENCE

[76] Inventor: Harry H. Bahrenburg, 11 Sherman Ct., Bethpage, N.Y. 11714

[21] Appl. No.: 58,090

[22] Filed: Jul. 16, 1979

[51] Int. Cl.³ .................. F03D 3/02; F03D 3/04; F03D 9/00
[52] U.S. Cl. .................. 60/398; 290/44; 290/55; 416/197 A; 417/334
[58] Field of Search .................. 60/398; 290/44, 55; 405/75; 415/2 R, 2 A, 3, 4; 416/9, 121 A, 122 A, 197 A; 417/334

[56] References Cited

U.S. PATENT DOCUMENTS

| 943,000 | 12/1909 | Busby | 60/398 |
|---|---|---|---|
| 1,876,595 | 9/1932 | Beldimano | 290/44 X |
| 2,169,165 | 8/1939 | Reedy | 416/9 |
| 2,436,747 | 2/1948 | DuBrie | 416/197 A X |
| 2,454,058 | 11/1948 | Hays | 60/398 |
| 3,426,214 | 2/1969 | O'Malley | 290/55 |
| 3,970,409 | 7/1976 | Luchuk | 416/197 A X |
| 4,037,983 | 7/1977 | Poeta | 415/2 |
| 4,074,951 | 2/1978 | Hudson | 415/2 |
| 4,142,367 | 3/1979 | Guisti | 60/325 |
| 4,156,580 | 5/1979 | Pohl | 416/121 A X |
| 4,165,468 | 8/1979 | Fry et al. | 416/121 A X |

Primary Examiner—Irwin C. Cohen
Attorney, Agent, or Firm—Frank Makara

[57] ABSTRACT

This invention relates to a wind fence, preferably of immense area, adapted to extract energy from the wind and convert it into commercial electricity. The fence of this invention comprises a module of unique design and construction. These modules are used in multiples to form fences up to five hundred (500') feet high up to five (5) miles long. The rotors within each module are vertically disposed and are interconnected, preferably by gears, to a fluid containing gear pump. The pump produces pressured fluid, and is conducted to a turbine operated by said fluid and which is connected to a conventional electrical generator. The depressurized fluid from the turbine is returned to said gear pump. In this invention the individual rotors always rotate in only one direction, regardless of the direction of the wind.

1 Claim, 12 Drawing Figures

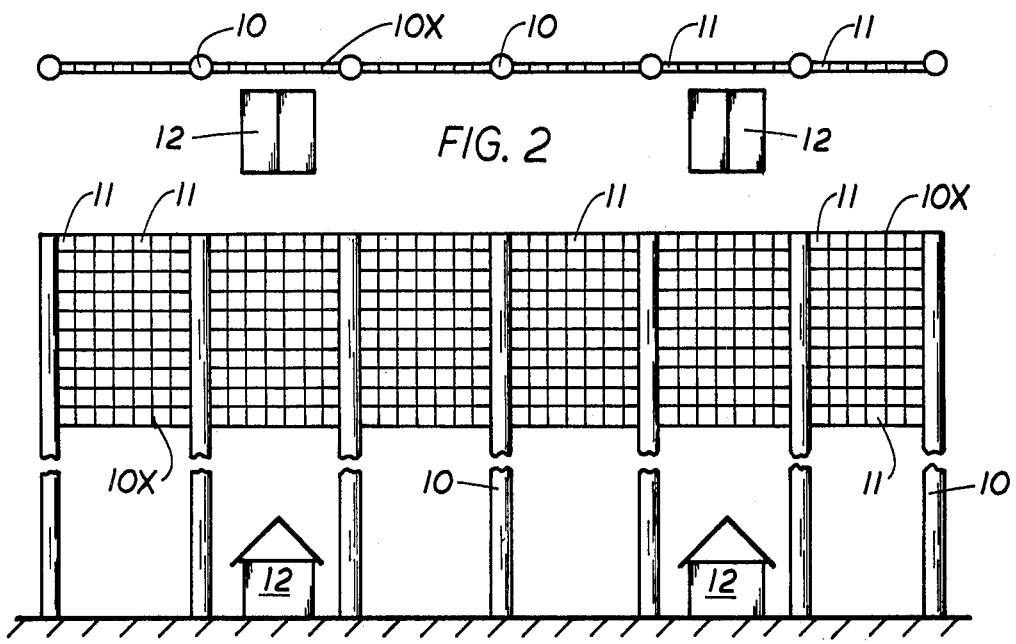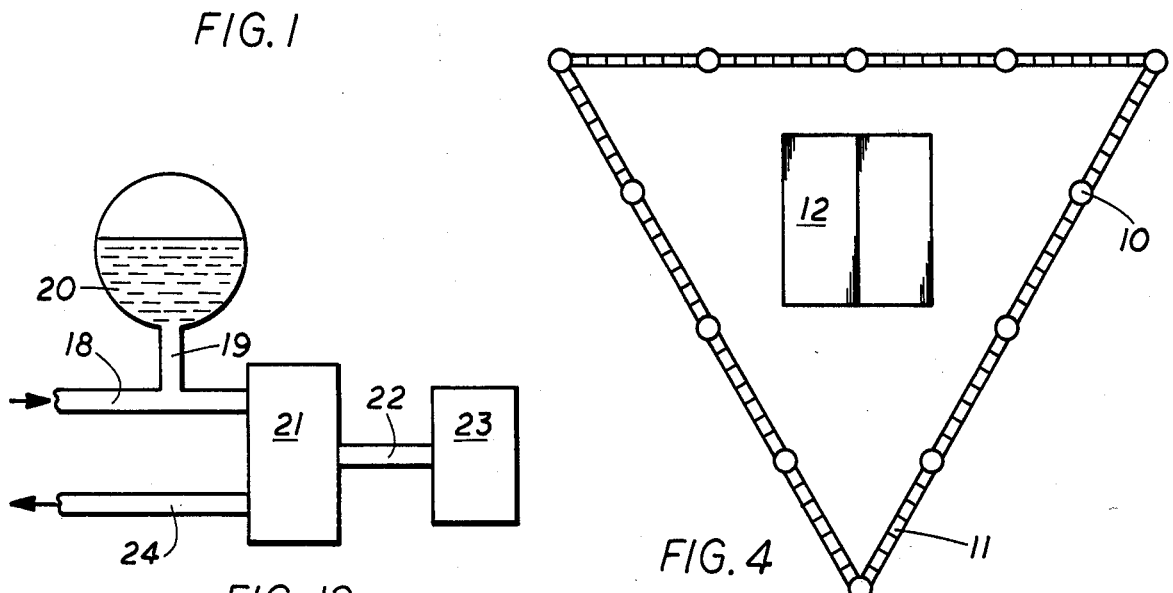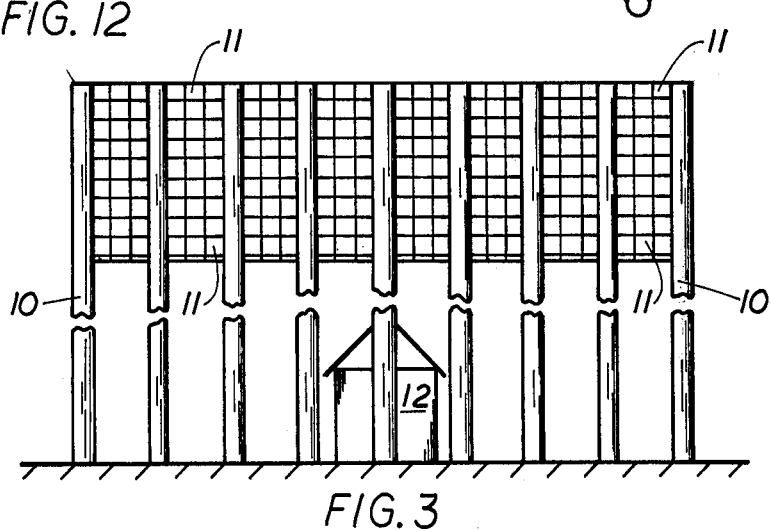

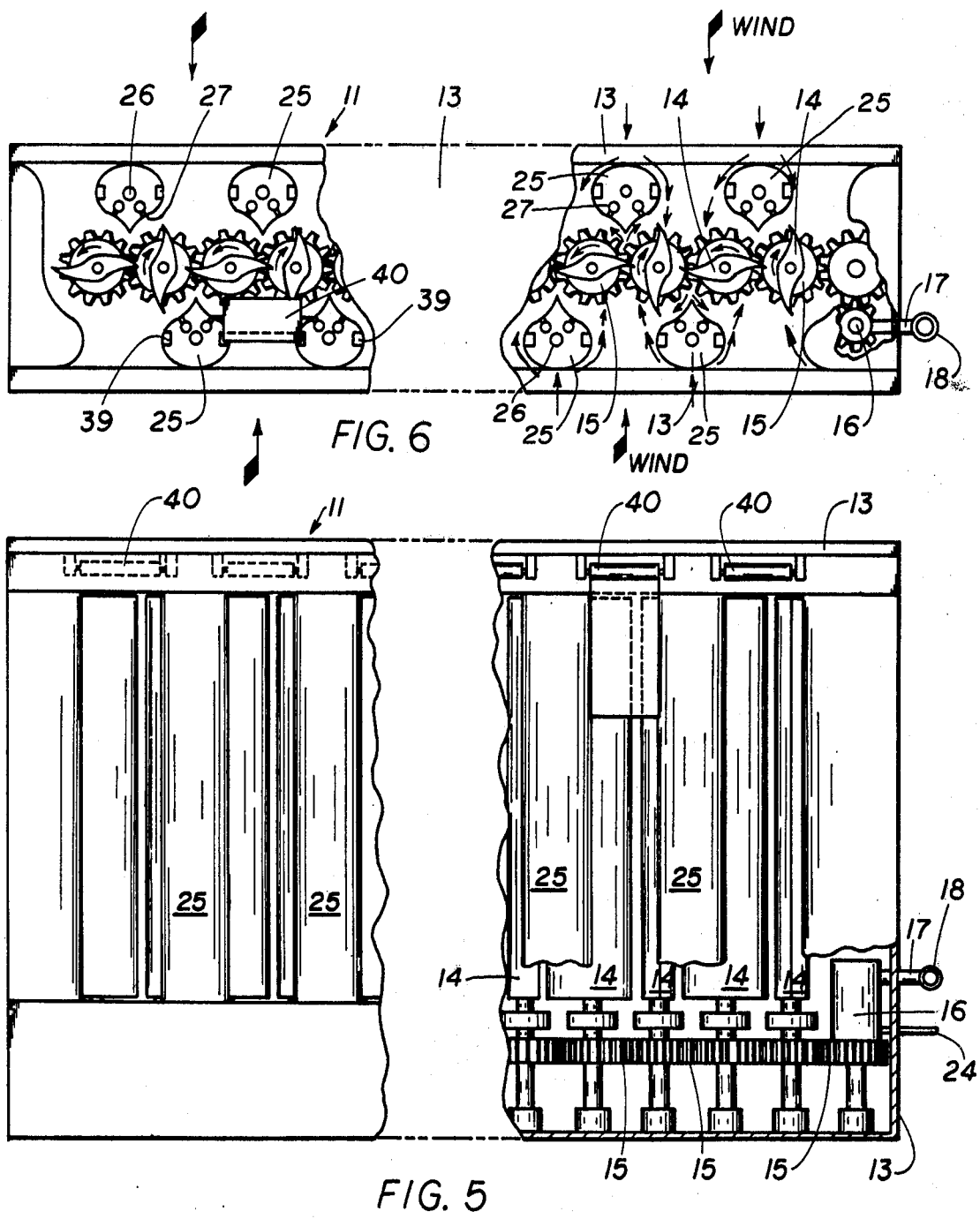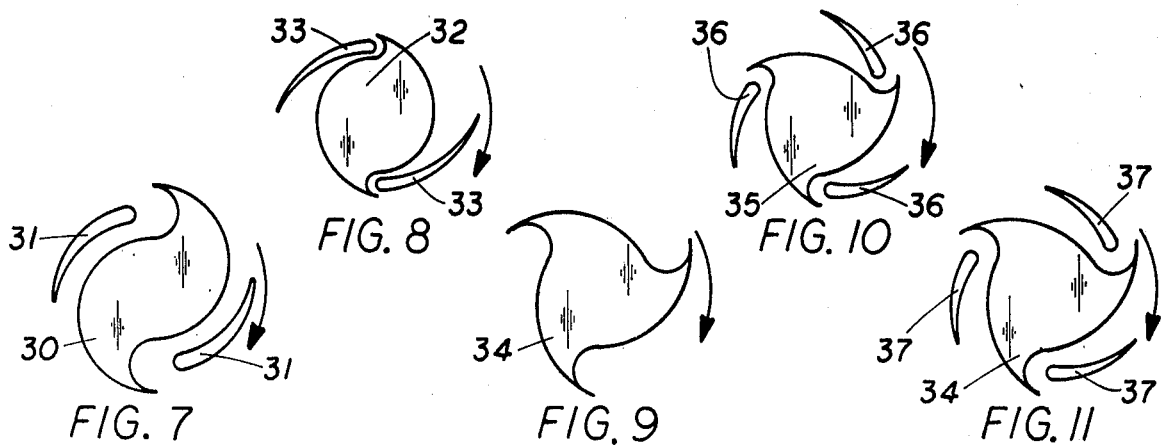

WIND FENCE

The prior art teaches various attempts to extract energy from small areas of wind. Thus, for example, U.S. Pat. No. 4,037,983, Poeta, July 26, 1977, teaches one method of obtaining energy from the wind and U.S. Pat. No. 4,074,951, Hudson, Feb. 21, 1978, teaches another method.

However, none of these prior art inventions even suggest the use of a module frame construction capable of being used as a single unit or in multiples of several hundred interconnected modular units, arranged in any one of a plurality of terrestial fence constructions. Preferably, the modules are arranged along side each other as well as above and below one another to form a huge planar fence to intercept a massive volume of wind. A linear fence is preferred where the wind blows alternately at 180°, as at a seashore. Where, however, the winds blow erratically, for example, in different directions, at different times of the year, a fence constructed in the form of an equilateral triangle or other polygonal configuration is preferred.

This invention is described herein by way of several illustrative embodiments as shown in the accompanying drawing in which:

FIG. 1 is a schematic side view of a linear fence, in schematic form, having many structual columns, a hundred or more feet high and having interposed between these columns supporting structural framing, and interconnected modular units to form a panel of units, several units high, and showing also a pair of powerhouses disposed on the ground for the generation of electricity;

FIG. 2 is a top view of the fence of FIG. 1;

FIG. 3 is a side view of a wind fence, in schematic form, disposed in the form of an equilateral triangle, and showing a central powerhouse therein;

FIG. 4 is a top view of the fence of FIG. 3;

FIG. 5 is a side view of a single module, broken away in part, to show the manner of locating the wind actuated rotors, the guide struts, the interconnected gearing of the rotors, and the gearing to the gear pump to pressure the fluid;

FIG. 6 is a top plan view of FIG. 5 showing the elements recited in FIG. 5;

FIGS. 7 through 11 are top views of various forms of bladed rotors usable in this invention, and;

FIG. 12 is a side view of the turbine-generator unit for producing electricity from the wind pressurized fluid.

Turning to the drawing and FIGS. 1 to 4 in particular, the linear wind fence of FIGS. 1 and 2 shows a plurality of structural columns 10 of metal which may be five hundred (500') feet tall and suitably spaced apart. At the upper portion of the wind fence, where the wind is free from surface currents, there are disposed in the fence framing 10x a plurality of modular fence units 11 to form a planar panel adapted to intercept a massive area and hence, volume of wind. A powerhouse 12 is provided on the ground for easy servicing for the central accumulation of all power from the various panel disposed modules 11.

In the description of the operation of this invention as shown in FIGS. 5 and 6, a conventional linear gear train is used wherein a clockwise rotating gear actuates a counter-clockwise rotating gear, and the wind receiving blades are mounted on a set of co-acting adjacent pair of gears so as to efficiently engage the wind energy.

Turning now to FIGS. 5 and 6, there is shown the basic module 11 in detail. These modules may be, for example, fourteen (14') feet tall and twenty-two (22') feet long and four (4') feet wide. The modules 11 comprise a rectangular structural metal housing 13. The power producing elements are bladed rotors 14 interconnected by gears 15.

The power developed from the rotors 14 is transmitted through the gears 15 to a gear-driven hydraulic pump 16 to produce pressurized fluid. The fluid output of each pump 16 of each module 11 is conducted through conduits 17 to a common manifold 18 and the entire fluid output is piped into the powerhouse 12.

As shown in FIG. 12, the pressurized fluid in conduit 18 is connected by conduit 19 to a suitably large surge tank 20 having a suitable gas column therein, for example, of nitrogen gas, to effect a relatively uniform fluid pressure and to function as a reservoir of fluid energy.

The pressurized fluid is lead into a fluid turbine 21 that is connected by a shaft 22 to an electrical generator 23.

The depressurized fluid from turbine 21, having its energy removed, is returned to the modules 11 through conduit 24 to gear pump 16.

In order to efficiently operate this wind fence, where, as in the northern regions of the Earth, icing may be encountered in the winter months, there is provided means to overcome this icing problem. Also, means are provided to guide wind from varying oblique directions effectively into the rotors.

Accordingly, a plurality of tapered struts 25 are provided of a configuration and location to provide for efficient guidance of air flow to and from the rotors 14. The struts are provided on each side of the module to obtain the best air flow pattern possible both on the intake and on the exit of the air from the module 11. This permits the maximum extraction of energy from the wind passing therethrough.

The struts 25 may be provided with heating means 26 and fluid spray means 27 to counteract any icing problems. Also, the struts 25 are provided with guide tracks 39 for roller type shutters 40 secured to the inside top wall of the modular frame. The shutters are raised or lowered by remote control for servicing the modules.

Various configurations of rotors are possible to obtain suitable results for local wind patterns. FIG. 7 shows a two bladed rotor 30 having suitable augmentor vanes 31 thereon. FIG. 8 shows a two bladed rotor 32 of a wider configuration than rotor 30, and wherein the augmentor vanes 33 are more closely disposed to the rotor 32.

FIG. 9 shows a three bladed rotor 34, FIG. 10 shows a smaller three bladed rotor 35 with three augmentor vanes 36 suitably disposed, to assist rotation. FIG. 11 shows a full-sized three bladed rotor 34 assisted by augmentor vanes 37.

This invention has been presented in its basic operable elements. Various refinements thereto can be added as needed or desired. For example, provision may be made for the removal and replacement of a defective module 11. Also means may be provided to repair a damaged module 11 without disrupting the operation of the other non-damaged modules. Similarly, computer monitoring of the various modules 11 and of the pressures produced throughout the system may be installed. All such conventional changes and the use of check valves, pressure gauges, etc., are deemed to be within the skill of the art and hence are included within the generic concept of this invention and the claims herein.

I claim:

1. A linear terrestial weathervaneless wind fence for the commercial production of electricity and adapted to engage winds from any direction comprising a plurality of suitably spaced-apart vertically disposed tall support columns; structural support means disposed between adjacent columns; a plurality of rectangular wind energy extracting modules disposed within said structural support means; each of said modules having a plurality of parallel vertically disposed wind actuated rotors; suitably curved vanes disposed on said rotors to effect unidirectional rotation; tapered, tear drop in cross section, vertically disposed struts for directing the wind to said rotors, disposed alternately above and below said rotors; a gear secured to each rotor, with each adjacent gear being in direct engagement with one another; conduit and pump means for tranferring gear energy into pressurized liquid; and turbine and generator means for converting said pressurized liquid into electricity.

* * * * *